United States Patent [19]

Adell

[11] Patent Number: 4,909,883

[45] Date of Patent: Mar. 20, 1990

[54] INSTALLATION OF NON-METALLIC DOOR EDGE GUARDS

[76] Inventor: Robert Adell, 200 Adell Blvd., Sunnyvale, Tex. 75182

[21] Appl. No.: 210,622

[22] Filed: Jun. 23, 1988

[51] Int. Cl.[4] .................. B32B 31/00; B60J 5/00; C09J 3/14

[52] U.S. Cl. ................... 156/247; 156/289; 156/323; 49/462; 293/128

[58] Field of Search ........ 156/247, 155, 230, 235, 156/289, 323, 344, 108, 71; 49/462; 52/716, 717, 718; 29/423, 424, 426.1, 426.3, DIG. 1; 293/126, 128; 428/40, 41, 42, 43, 352

[56] References Cited

U.S. PATENT DOCUMENTS

| | | | |
|---|---|---|---|
| 1,875,766 | 9/1932 | Schubert | 428/198 |
| 3,494,075 | 2/1970 | Kunevicius | 52/716 |
| 3,843,475 | 10/1974 | Kent | 52/717 |
| 4,331,727 | 5/1982 | Maas | 428/352 |
| 4,575,147 | 3/1986 | Ui et al. | 49/462 |
| 4,775,570 | 10/1988 | Ohlenforst et al. | 428/358 |
| 4,796,386 | 1/1989 | Adell | 49/462 |
| 4,817,335 | 4/1989 | Adell | 49/462 |

Primary Examiner—Michael W. Ball
Assistant Examiner—Louis Falasco
Attorney, Agent, or Firm—G. L. Boller

[57] ABSTRACT

A method for installing a non-metallic edge guard on the trailing edge of an automobile door through the use of double back adhesive tape. The tape is first applied to the trailing edge with the side that is toward the edge containing exposed adhesive and the opposite side being covered by a release layer. After the tape has been installed, a portion of the release layer is stripped away from the tape while the remainder of the installed tape remains covered by the release layer. The edge guard is then fitted onto the trailing edge, covering that portion of the tape from which the release layer has been stripped as well as an immediately contiguous portion where the release layer has not been stripped away from the tape. The stripped away portion of the release layer is then pulled to expose adhesive on the immediately contiguous portion of the tape that is covered by the edge guard and this process is continued until the edge guard is completely installed, adhering along its entire length to the exposed adhesive on the outer side of the double back tape.

3 Claims, 3 Drawing Sheets

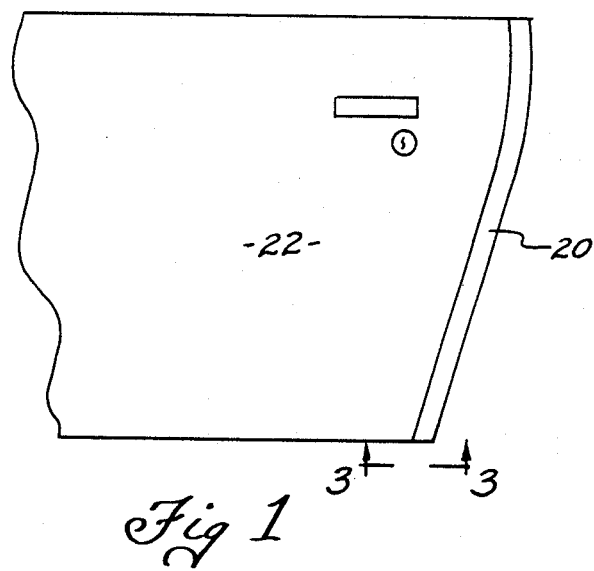
Fig 1
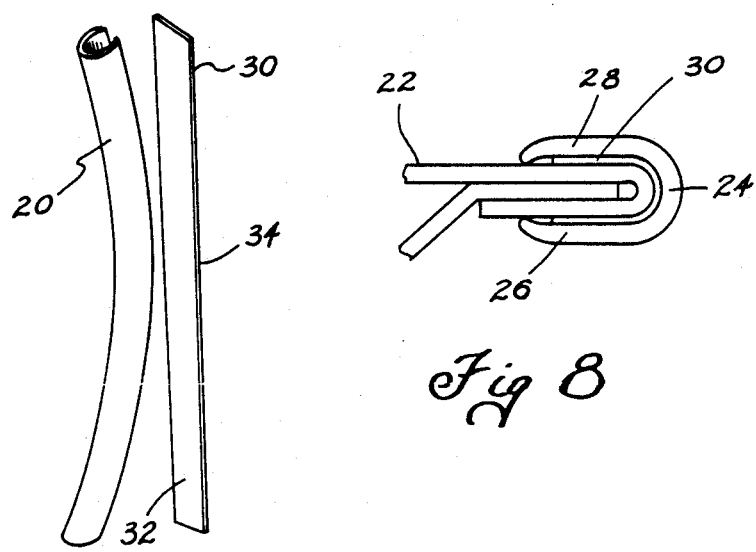
Fig 2
Fig 8

INSTALLATION OF NON-METALLIC DOOR EDGE GUARDS

BACKGROUND AND SUMMARY OF THE INVENTION

This mechanical invention relates to decorative and protective edge guards that are applied to the trailing edges of automobile doors. More specifically the invention relates to the installation of a non-metallic type door edge guard by use of double-back adhesive tape.

Non-metallic edge guards are not broadly new. Examples exist in prior patents such as U.S. Pat. No. 3,547,516 and U.S. Pat. No. 4,372,083. While these prior non-metallic edge guards claim to possess certain beneficial characteristics, the truth of the matter is that in practice they are difficult to install, especially on contoured edges, and once installed, they may not retain satisfactorily over the life of the automobile.

Applicant has several pending patent applications relating in certain respects to improvements in the installation of non-metallic door edge guards on the trailing edges of automobile doors. These applications are Ser. No. 07/066,858, filed June 25, 1987, now U.S. Pat. No. 4,796,386, Ser. No. 07/076,366, filed July 22, 1987 now U.S. Pat. No. 4,817,335 and Ser. No. 07/205,303, filed June 10, 1988. As disclosed in the application filed June 10, 1988 applicant has discovered that a more convenient manner of installing non-metallic door edge guards on the trailing edges of automobile doors can be accomplished using high quality adhesives embodied in a double back adhesive tape by first installing the double back tape on the trailing edge of the door and then installing the door edge guard over the tape-containing trailing edge. Because the tape alone is first applied to the door, accuracy in locating the tape is more readily obtained because the tape is visible at all times during its installation process.

The invention of this application relates to a new and improved method for installing a non-metallic edge guard on the trailing edge of the door through use of double back adhesive tape. Briefly, the tape is applied to the door such as in the manner described in the patent application filed June 10, 1988. However, instead of stripping the entirety of the outer release layer from the installed double back tape, that release layer is pulled away over a short distance at just one end of the installed tape. This leaves the stripped portion of the release layer free for grasping. The edge guard is then fitted onto the trailing edge of the door over the double back adhesive tape and is adhered against the exposed adhesive where the release layer has been stripped away. The stripped portion of the release layer remains outside the fitted edge guard and can now be pulled away while the tape remains covered by the edge guard with the result that the remainder of the release layer is pulled from the tape underlying the fitted edge guard thereby exposing the adhesive along the full length of the tape. Since the edge guard is already positioned in covering relation to the tape, at most all that need be done to the edge guard is to press it into better contact with the exposed adhesive along the length of the tape where the release layer has been pulled away.

This invention provides for an installation that is convenient and that can accurately locate the edge guard on the door edge in a precise relation to tape that has been previously installed on the edge.

The foregoing features, advantages, and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

BRIEF DESCRIPTION OF THE DRAWINGS

FIG. 1 is a fragmentary side elevational view of an automobile door whose trailing edge contains a door edge guard installation according to the present invention.

FIG. 2 is an exploded perspective view illustrating the door edge guard and the double back tape that are used in the installation.

FIG. 8 is a view in the same direction as the view of FIG. 3 showing the completed installation.

DESCRIPTION OF THE PREFERRED EMBODIMENT

Figure 3:
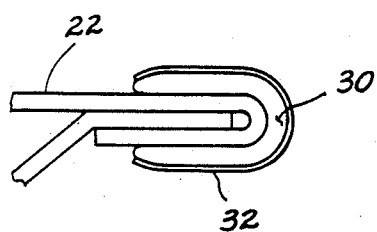
FIG. 3 is a transverse view taken in the direction of arrows 3—3 in FIG. 1 on an enlarged scale but illustrating only the double back tape having been applied to the trailing edge of the door.

FIGS. 1 and 8 show the condition of the finished installation of a door edge guard 20 on the trailing edge of an automobile door 22. The edge guard is fitted on to the trailing edge to provide a decorative appearance and also to protect the trailing edge against knicks, scratches and the like damage which might otherwise occur to it when the door is swung open and the trailing edge strikes an object in the presence of the doors path, such as in a crowded parking lot or other confined space for example.

Edge guard 20 comprises a non-metallic body of generally U shaped cross section having a generally semi-circular base 24 from which extend inner and outer legs 26 and 28 respectively. In the installed position of edge guard 20 on the trailing edge of door 22, base 24 is disposed in covering relation to the end of the trailing edge, inner leg 26 in covering relation to the inside of the trailing edge, and outer leg 28 in covering relation to the outside of the trailing edge.

Edge guard 20 is preferably formed of a suitable plastic that can be fabricated by conventional techniques such as extrusion to the desired cross section shape. The material of the edge guard has a certain degree of conformability for fitting onto trailing edges that are contoured. The edge guard may also have various decorative aspects that are obtained by applying inserts to the exterior surface of the edge guard such as for example the inserts that are shown in applicant's U.S. Pat. No. 4,730,415 issued Mar. 15, 1988.

The double back adhesive tape that is used to adhere edge guard 20 to the trailing edge of door 22 is designated by the general reference numeral 30. It is in the form of a thin rectangular strip having a given width that is suitable for the particular dimensions of door edge guard 20. Prior to installation, both edge guard 20 and tape strip 30 are separate parts as seen in FIG. 2. Tape 30 is a conventional commercially available product that comprises a main body that may be either a paper type product or a synthetic product that contains adhesive on its opposite sides. The body of the tape can also be of a material such as a very thin foam. Depending upon how the double back tape is fabricated, at least one of the adhesive containing sides is covered by a strippable release layer 32. When the strip is sold in a rolled up coil form only one release layer may be needed. However where the double back strip is sold in a strip form there will be a second release layer 34 covering the opposite side of the strip as well.

At the time of installation the strip is placed in a condition where one side contains exposed adhesive and the other side remains covered by a release layer such as release layer 32. The exposed adhesive side is disposed against the trailing edge of door 22 in the manner portrayed by FIGS. 3 and 4 where it is conformed fully to the shape of the trailing edge, covering the outside, the end, and the inside of the edge where the edge guard 20 will fit over it in covering relationship. By leaving the release layer 32 on the tape strip during its installation on the door edge, the installation process is facilitated. Moreover, because the tape can be seen at all times during its installation on the trailing edge, it can be accurately placed on the trailing edge.

Figure 4:
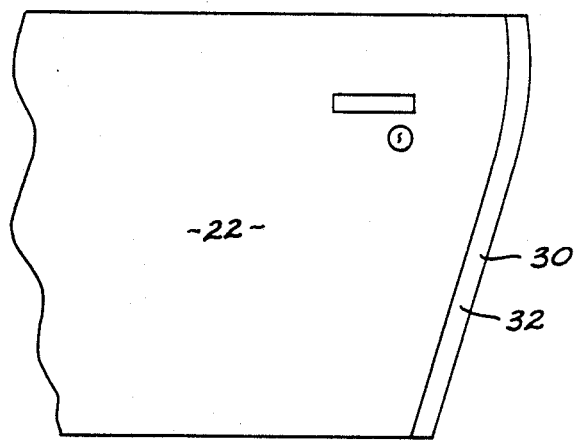
FIG. 4 is a side elevational view of the trailing edge containing the double back tape installed thereon.
Figure 5:
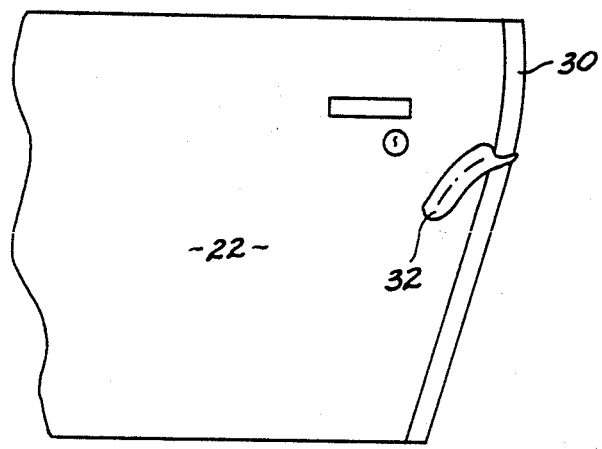
FIG. 5 is a view similar to FIG. 4 but with the release layer covering the exterior of the double back tape having been pulled away along a portion of the length of the tape at one end.

Therefore after the tape has been installed to the condition represented by FIGS. 3 and 4, the release layer is stripped away from the tape for a portion of the length of the tape strip adjacent one end. For example a length of several inches or so will be suitable. A sufficient length of the release layer is stripped away so that it can be grasped for subsequent use in completing the installation process as will be hereinafter explained in detail. FIG. 5 shows the condition after this initial stripping of the release layer. In this regard the release layer is sufficiently strong that it will not tear or break when being pulled away from the tape strip, and the stripping process is in the nature of peeling the release layer from the tape.

Figure 6:
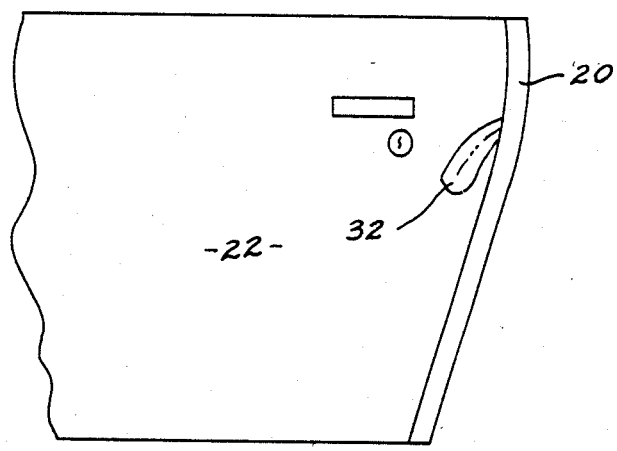
FIG. 6 is a view in the same direction as the view of FIG. 5 with the tape and release layer in the same condition as in FIG. 5, but now with the door edge guard having been fitted onto the trailing edge.

Next the edge guard is fitted in its entirety onto the trailing edge of the door and over the installed tape strip 30. (See FIG. 6.) The edge guard is installed in such a manner that the stripped-away end of the release layer remains free on the exterior of the edge guard where it can be grasped. Since the stripping of the release layer exposes a corresponding amount of adhesive on the tape, the edge guard is adhered to the exposed adhesive in that region upon its installation.

Since the nominal transverse cross section of the edge guard is shaped for a fairly close fit onto the trailing edge of the door, it may be desirable to spread the legs apart during this initial installation progress, particularly in the area where the edge guard will be fitted onto the exposed adhesive. Then after the base of the edge guard has been pushed against the exposed tape at the end of the trailing edge, the legs can be pressed inwardly against the sides of the trailing edge to be adhered to the exposed tape thereon.

The installation process is continued now by stripping away more of the release liner to expose more adhesive. Stripping of the release layer is conducted by pulling the already released segment of the release layer downwardly as from the FIG. 6 to the FIG. 7 condition. Since the upper end of the door edge guard has already been securely adhered to the tape as explained above, further adherence of the rest of the edge guard to the now exposed tape may be conducted by pressing the legs inwardly against the sides of the trailing edge. A convenient way to install the edge guard is to pull the release layer downwardly either all at once or in several lesser increments and then after each pulling of the release layer, pressing the edge guard into better contact with the exposed adhesive. This process is continued until the entirety of the release layer has been stripped from the adhesive tape.

Figure 7:
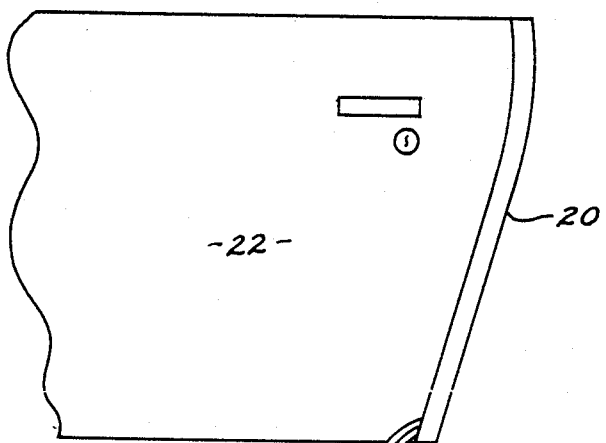
FIG. 7 is a view in the same direction as the view of FIG. 6 showing the release layer having been further stripped from the tape while the tape remains covered by the installed edge guard.
Figure 7:

FIG. 7 represents the conclusion of the process of stripping the release layer from the tape at which time the release layer can be discarded. FIGS. 1 and 8 represent the completed door edge guard installation.

Although the installation has been illustrated and described to comprise the fitting of the entire length of the edge guard onto the installed tape after the initial stripping of the release layer from the one end of the installed tape, it is to be appreciated that principles of the invention can be practiced where the edge guard is progressively fitted onto the trailing edge. In other words such an installation process would comprise the same initial steps of installing the tape and stripping the release layer from one end as described, fitting the edge guard over the trailing edge both in covering relation to the exposed tape where it is adhered to the trailing edge and in covering relation to an immediately contiguous portion of the remaining length of the tape. The release layer can be stripped a limited amount and the edge guard adhered to the newly exposed adhesive; then more of the edge guard can be fitted onto the trailing edge and more release layer stripped away and this pattern repeated along the length of the tape and edge guard until the entire edge guard has been installed.

What is claimed is:

1. The method of installing a non-metallic edge guard on a trailing edge of a swinging closure which comprises:

providing an elongated non-metallic edge guard having a shape for fitting onto the trailing edge of the swinging closure;

providing a strip of double back adhesive tape having adhesive on two sides and a length and width suitable for use in adhering the edge guard to the trailing edge wherein a release layer covers one side of the tape while the other side of the tape is uncovered to expose adhesive;

installing said tape to the trailing edge of the swinging closure by adhering said other side of said tape adhering to the trailing edge;

stripping a portion of the release layer of said one side from the tape that has been installed on the trailing edge while the remainder of the release layer remains covering said one side of the installed tape;

fitting the edge guard onto the trailing edge such that the edge guard fits over at least a portion of the tape where the release layer has been stripped away and also an immediately contiguous portion where the release layer has not been stripped away, such fitting of the edge guard onto the trailing edge leaving the stripped away portion of the release layer exterior of the edge guard where it can be grasped and pulled;

then grasping and pulling the stripped away portion of the release layer to expose adhesive on said immediately contiguous portion of the tape that is covered by the edge guard;

and urging the edge guard against the adhesive that has been exposed on said one side of the tape by stripping of the release layer therefrom.

2. The method as set forth in claim 1 in which said edge guard has a shape comprising a base and inner and outer legs, the trailing edge of the swinging closure has an end surface and inner and outer surfaces and wherein the step of adhering the tape to the trailing edge comprises adhering the tape to the inner, the end and the outer surfaces of the trailing edge, and the step of fitting the edge guard onto the tape that has been installed on the trailing edge comprises disposing the inner leg of the edge guard over a corresponding portion of the tape on the inner surfaces of the trailing edge, disposing the base of the edge guard over that portion of the tape which covers the end of the trailing edge, and disposing the outer leg of the edge guard over that portion of the tape that covers the outer surface of the trailing edge.

3. The method set forth in claim 1 in which the step of fitting the edge guard onto the trailing edge such that the edge guard fits over at least a portion of the tape where the release layer has been stripped away and also an immediately contiguous portion where the release layer has not been stripped away comprises fitting the edge guard over fully on a remainder of the tape where the release layer has not been stripped away and wherein the step of pulling the stripped portion of the release layer to expose adhesive on said immediately contiguous portion of the tape that is covered by the edge guard comprises stripping away the entirety of the release layer from the tape.

* * * * *